W. WEBBER.
TRACTION WHEEL ATTACHMENT.
APPLICATION FILED MAR. 18, 1918.

1,388,985.

Patented Aug. 30, 1921.

Inventor.
William Webber,
by Chas. E. Lord
Atty.

UNITED STATES PATENT OFFICE.

WILLIAM WEBBER, OF LA GRANGE, ILLINOIS, ASSIGNOR, BY MESNE ASSIGNMENTS, TO INTERNATIONAL HARVESTER COMPANY, A CORPORATION OF NEW JERSEY.

TRACTION-WHEEL ATTACHMENT.

1,388,985. Specification of Letters Patent. Patented Aug. 30, 1921.

Application filed March 18, 1918. Serial No. 223,210.

*To all whom it may concern:*

Be it known that I, WILLIAM WEBBER, a citizen of the United States, residing at La Grange, in the county of Cook and State of Illinois, have invented certain new and useful Improvements in Traction-Wheel Attachments, of which the following is a full, clear, and exact specification.

My invention relates to lugs for traction wheels, such as used more particularly on harvesting machines.

It has been found necessary in connection with the use of harvesting machines in muddy soil to provide supplemental traction lugs on the harvester wheels in order to prevent the wheels from slipping, and to give the desired traction to the machine. This form of construction is especially necessary on rice harvesting machines since the soil in the rice fields is muddy, and is often covered with water when the rice is harvested.

The present invention has, for its object, to provide a construction that shall meet the needs above outlined, and will provide sufficient traction to enable the harvester to operate successfully under all conditions.

A further object is to provide a supplemental traction device that can be used in connection with a regular harvester wheel when desired, but which will permit of the wheel being used under ordinary conditions without the supplemental device.

With the accomplishment of the above defined objects in view, I have provided a traction wheel with supplemental traction devices, such as raised portions, to which may be secured outwardly projecting lugs. The supplemental traction devices may be formed on the periphery of the wheel, or may be carried by plates that are adapted to be secured to the wheel.

In the drawings I have illustrated one embodiment of my invention, and—

Figure 1:
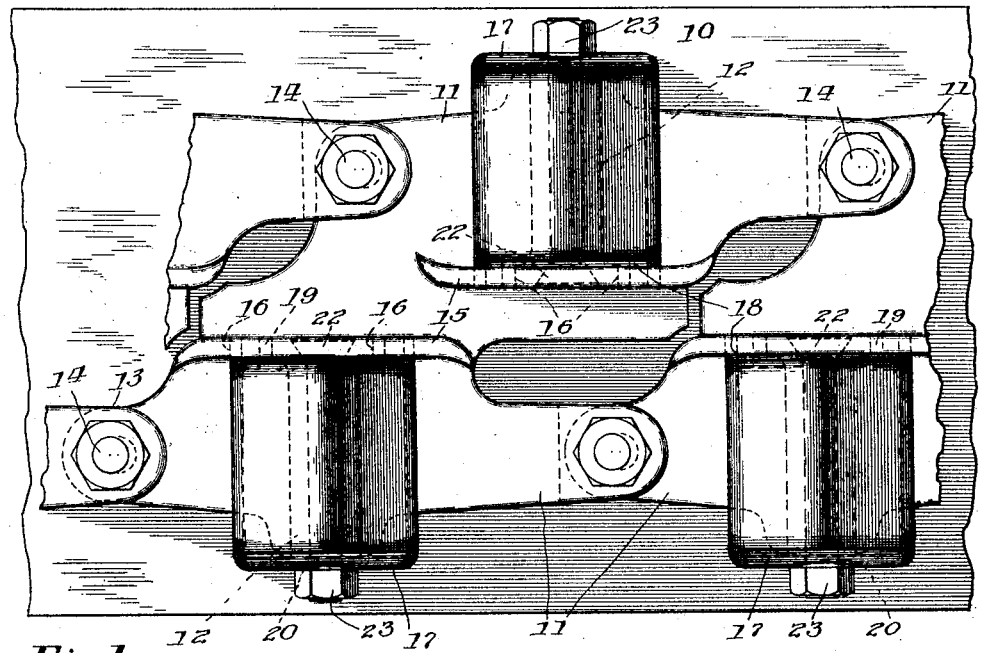
Figure 1 shows a plan view of a portion of the harvester wheel equipped with my improved traction lugs.
Figure 2:
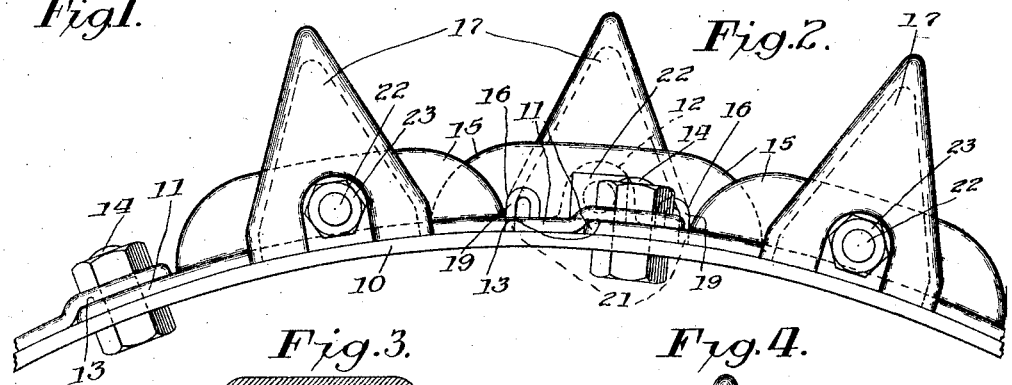
Fig. 2 is a side elevation of the construction shown in Fig. 1.
Figure 3:
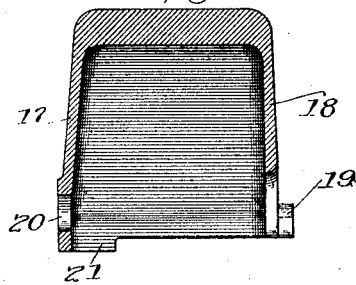
Fig. 3 is a cross-section of one of the lugs.
Figure 4:
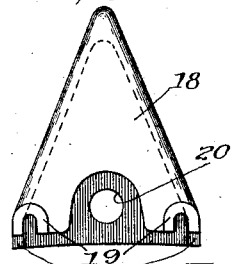
Fig. 4 is an end view of the lug.

The periphery of the harvester wheel is shown at 10, and I have secured to this periphery a series of plates 11, having transverse raised portions 12 disposed in staggered relation entirely around the circumference of the wheel. These plates 11 are overlapped, as shown at 13, and are bolted to each other and to the wheel by suitable bolts 14. The raised portions 12 are provided with longitudinal bores adapted to receive bolts hereinafter described.

The plates 11, in addition to the raised portions 12, are provided with vertical longitudinally disposed ribs 15, located at the inner ends of the portions 12. The ribs 15 are apertured, as shown at 16, to receive outwardly extending projections on the supplemental traction lugs hereinafter described, these apertures 16 being spaced equally distant from the raised portions 12 above described. The supplemental lugs are substantially V-shaped, hollow, and have end walls 17 and 18.

The walls 18 have outwardly extending projections 19 above mentioned, and the walls 17 are apertured, as shown at 20. When in position on the plates the supplemental lugs are so disposed that the projections 19 extend through the apertures 16 on the vertical ribs 15 formed on the plates 11, and the walls 17 are disposed outside the outer ends of the plates 11, the lower portions 21 of the supplemental lugs resting on the periphery of the wheel. When the lugs are so positioned, securing bolts 22 are passed through the vertical ribs 15, and through the longitudinal bores and the raised portions 12, and through the apertures 20 in the lugs, the outer ends of these bolts having nuts 23 to secure the lugs in place thereon. Since these bolts pass through the ribs 15, through the longitudinal bore of the raised portions of the plates, and through the outer wall of the lugs, it will be seen that the lugs and their inwardly projecting portions 19 are securely held on the plates and to the periphery of the traction wheel. When the soil on which the machine is being operated is not muddy, the raised portions 12 on the plates which are secured to the traction wheel will provide sufficient traction for the machine, and the supplemental lugs are not used. However, when the machine is used, for instance in harvesting rice, and the soil is muddy, the supplemental lugs are bolted in place, and provide an increased amount of traction to meet the needs of the changed conditions. The vertical ribs 15 form a longitudinal channel around the circumference of the traction wheel, and may act as a guide for a scraper secured to the frame of the harvester which scrapes the dirt and mud from the periphery of the wheel.

My improved supplemental lug may be easily and quickly applied to the wheel, and when applied is securely held in place, and under changed conditions may be readily and quickly removed.

While I have, in the above specification, described one embodiment which my invention may assume, it will be understood that modifications may be made without departing from the spirit and scope of my invention as expressed by the following claims.

What I claim as new is:

1. A traction wheel having in combination a series of plates secured thereto, said plates having transversely disposed spaced raised portions thereon, each of said raised portions having a longitudinal bore therethrough adapted to receive a retaining bolt whereby a supplemental lug may be secured thereto.

2. In combination, a traction wheel having a plurality of outwardly extending traction lugs secured to the periphery thereof and having longitudinal bores, a plurality of supplemental lugs, and means passing through the bores of said first named lugs for securing said supplemental lugs thereto.

3. A traction wheel having in combination a series of plates secured thereto, said plates having raised transversely extending portions disposed in staggered relation around the circumference of the wheel, each of said raised portions having a longitudinal bore therethrough, and a supplemental lug adapted to be secured to each of said raised portions by means passing through the longitudinal bore.

4. A traction wheel having in combination a series of plates secured thereto, said plates being provided with transversely extending raised portions, longitudinally extending ribs disposed at one end of said raised portions, and supplemental traction lugs secured to said longitudinal ribs and raised portions.

5. A traction wheel provided on its periphery with a series of transverse raised portions, a series of vertical ribs disposed at one end of said raised portions, and supplemental lugs secured to said raised portions and to said ribs.

6. A traction wheel having in combination a series of transverse raised portions disposed in staggered relation around the periphery of the wheel, a series of longitudinal ribs disposed at one end of said raised portions, said raised portions having longitudinal bores therethrough, said ribs having spaced apertures, and a series of lugs adapted to be secured to said raised portions and longitudinal ribs by outwardly extending projections engaging in the apertures of said ribs and means extending through the longitudinal bores.

7. In a traction wheel, a transverse raised portion, a longitudinal rib disposed at one end of said transverse raised portion, and a traction lug secured to said transverse portion and to said rib.

8. A traction wheel having in combination a transverse raised portion provided with a longitudinal bore, a longitudinally disposed rib at one end of said raised portion and having spaced apertures therein, a lug having projections registering with said apertures, said lug extending on one side over the end of said transverse raised portion and having an aperture registering with the longitudinal bore therein, and securing means engaging in the longitudinal bore and aperture.

9. In combination, a traction wheel having a plurality of outwardly extending transverse traction lugs carried by the periphery thereof, supplemental lugs adapted to be secured to said transverse lugs, and means passing through said transverse lugs and said supplemental lugs for securing said supplemental lugs to said transverse lugs.

10. In combination, a traction wheel having a plurality of outwardly extending longitudinally bored traction lugs carried by the periphery thereof, supplemental lugs adapted to be secured to said first named lugs, and means for securing said supplemental lugs to said first named lugs passing through the longitudinal bores of said first-named lugs.

11. In combination, a traction wheel having a plurality of transversely disposed raised portions on the periphery thereof, and longitudinally extending ribs disposed at one end of said raised portions, a suppplemental lug, and means passing through said transversely disposed raised portions for securing said supplemental lugs to said raised portions and said ribs.

12. A supplemental traction device adapted to be secured to a traction wheel, and comprising a plate provided with transversely extending raised portions, longitudinally extending ribs disposed at one end of said raised portions, and supplemental traction lugs secured to said longitudinal ribs and raised portions.

13. A supplemental traction device adapted to be secured to a traction wheel, and comprising a plate having a transverse raised portion provided with a longitudinal aperture therethrough, a longitudinally disposed rib located at one end of said raised portion, and a traction lug secured to said raised portion and said rib by means passing through the longitudinal bore.

14. In combination, a traction wheel having a smooth periphery, traction lugs secured to the periphery and extending radially outward therefrom, hollow V-shaped auxiliary lugs fitting over the traction lugs and means outside the periphery of the wheel for securing the auxiliary lugs to the traction lugs.

15. In combination, a traction wheel, traction lugs secured to the periphery of the wheel and extending radially outward therefrom, hollow auxiliary lugs fitting over the traction lugs and means passing through the traction and auxiliary lugs outside the periphery of the wheel for securing the latter to the former.

16. In combination, a traction wheel having traction lugs projecting radially from its periphery and provided with openings outside the periphery of the wheel, auxiliary lugs fitting over and engaging the traction lugs and having openings registering with the openings in the traction lugs and securing means engaging in the registering openings to secure the auxiliary lugs to the traction lugs.

In testimony whereof I affix my signature.

WILLIAM WEBBER.